United States Patent
Ward

(10) Patent No.: US 8,442,077 B2
(45) Date of Patent: May 14, 2013

(54) AUTOMATICALLY CONFIGURING A DISTRIBUTED NETWORK ANALYZER TO MONITOR IDENTIFIED INVERSE MULTIPLEX GROUPS OF AN ASYNCHRONOUS TRANSFER MODE NETWORK

(75) Inventor: Robert Geoffrey Ward, Colorado Springs, CO (US)

(73) Assignee: JDS Uniphase Corporation, Milpitas, CA (US)

( * ) Notice: Subject to any disclaimer, the term of this patent is extended or adjusted under 35 U.S.C. 154(b) by 1698 days.

(21) Appl. No.: 11/066,530

(22) Filed: Feb. 28, 2005

(65) Prior Publication Data

US 2006/0193349 A1    Aug. 31, 2006

(51) Int. Cl.
*H04J 3/04* (2006.01)
(52) U.S. Cl.
USPC .......................... 370/536; 370/395.1; 370/535
(58) Field of Classification Search .................. 370/536, 370/252, 254, 235, 236.2, 236, 395.1, 395.3, 370/395.41, 395.62, 395.71, 394, 535, 412; 375/356, 372
See application file for complete search history.

(56) References Cited

U.S. PATENT DOCUMENTS

| | | | |
|---|---|---|---|
| 6,115,381 A * | 9/2000 | Benenti et al. | 370/395.21 |
| 6,621,794 B1 * | 9/2003 | Heikkinen et al. | 370/235 |
| 7,065,104 B1 * | 6/2006 | Seren et al. | 370/536 |
| 7,212,548 B2 * | 5/2007 | Bridges et | 370/473 |
| 7,460,541 B2 * | 12/2008 | Ward et al. | 370/395.1 |
| 2005/0286568 A1 * | 12/2005 | Hsueh et al. | 370/536 |
| 2006/0072579 A1 * | 4/2006 | Ward et al. | 370/395.1 |

* cited by examiner

*Primary Examiner* — Chuong T Ho
(74) *Attorney, Agent, or Firm* — Volentine & Whitt, PLLC

(57) ABSTRACT

A method and apparatus of automatically identifying IMA links of an asynchronous transfer mode network and automatically configuring a distributed network analyzer to monitor the identified IMA links. Information is selectively extracted from streams of cell data exchanged across an asynchronous transfer mode network to automatically identify IMA links of the asynchronous transfer mode network, and automatically configuring a distributed network analyzer to monitor the identified IMA links. A graphical user interface is provided to display status information of the automatically identified IMA links of an asynchronous transfer mode network based on monitoring of the identified IMA links using a distributed network analyzer automatically configured to monitor the identified IMA links.

13 Claims, 5 Drawing Sheets

AUTOMATICALLY CONFIGURING A DISTRIBUTED NETWORK ANALYZER TO MONITOR IDENTIFIED INVERSE MULTIPLEX GROUPS OF AN ASYNCHRONOUS TRANSFER MODE NETWORK

BACKGROUND OF THE INVENTION

Description of Related Art

Asynchronous transfer mode (ATM) is a high-speed network technology based on transferring data in ATM cells or packets of a fixed size. Transmission of ATM cells within an ATM based network uses dedicated links such as DS1, DS3 or OC-3. A user will need to lease or gain access to the dedicated link. However, leasing one dedicated link is not a viable solution for some users with certain requirements. For example, a user may have a need for access to more than one dedicated link but may not have adequate need to justify access to a dedicated link of a higher speed and simply adding another dedicated link would not preserve critical time ordering of ATM cells.

Inverse multiplexing over asynchronous transfer mode (IMA) provides a solution to the issue presented above by transporting a high-speed channel composed of ATM cells as a number of lower-speed channels and reassembling the ATM cells as the original high-speed channel to allow users to gain access to the lower-speed channels in accordance with the users' need. A typical IMA network includes several ATM network connections (logical connections) inverse multiplexed into numerous links that are grouped together into IMA groups where each IMA group corresponds to one logical connection. IMA networks are well known.

Accordingly, it is important to provide users with respective IMA network information. This becomes especially important when there is a need to provide IMA network information to a user that has data transmitted across various links of the IMA network. Further, it is important to provide a user with information about any possible problems occurring with respect to the user's data transmitted across various links of the IMA network. Unfortunately, with typical solutions, the user is required to manually set up IMA links and IMA groups of the IMA network to be monitored.

BRIEF DESCRIPTION OF THE DRAWINGS

Aspects and advantages of the invention will become apparent and more readily appreciated from the following description of the embodiments, taken in conjunction with the accompanying drawings of which.

DETAILED DESCRIPTION OF THE PREFERRED EMBODIMENTS

Figure 1:
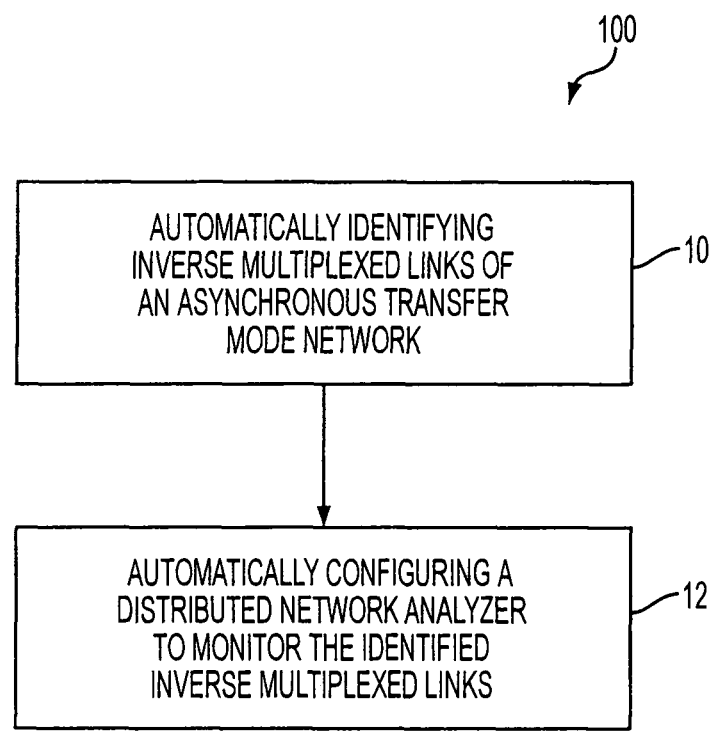
FIG. 1 is a diagram illustrating a method of automatically identifying IMA links of an asynchronous transfer mode network and automatically configuring a distributed network analyzer to monitor the identified IMA links, according to an embodiment of the present invention.

Reference will now be made in detail to the present embodiments of the present invention, examples of which are illustrated in the accompanying drawings, wherein like reference numerals refer to the like elements throughout. The embodiments are described below to explain the present invention by referring to the figures.

FIG. 1 is a diagram illustrating a process 100 for automatically identifying IMA links of an asynchronous transfer mode network and automatically configuring a distributed network analyzer (DNA) to monitor the identified IMA links, according to an embodiment of the present invention. The term "automatically" indicates that the identification and configuration processes are performed in an automated manner by a machine, as opposed to performance by humans. The machine might include, for example, a computer processor. Similarly, the term "automated" indicates that the operations are performed in an automated manner by a machine, as opposed to performance by humans.

Referring to FIG. 1, in operation 10, IMA links of an IMA network are automatically identified. According to an aspect of the present invention, the IMA links of an IMA network are automatically identified based on, for example, evaluation of data transmitted across the IMA network. For example, IMA data is differentiated from other ATM data transmitted across the network so that all IMA links of the network are identified. While identification of the IMA links is described using differentiation of ATM data from IMA data, the present invention is not limited to any particular method of identifying IMA data.

From operation 10, the process 100 moves to operation 12, where a distributed network analyzer is automatically configured to monitor the identified IMA links. Here, information of the identified IMA links is transmitted, for example, to a distributed network analyzer for configuring the distributed network analyzer to monitor the identified IMA links. This eliminates the need to manually configure IMA links of an IMA network to be monitored by a distributed network analyzer. The present invention is not limited to any particular type of network analyzer to monitor the identified IMA links.

Figure 2:
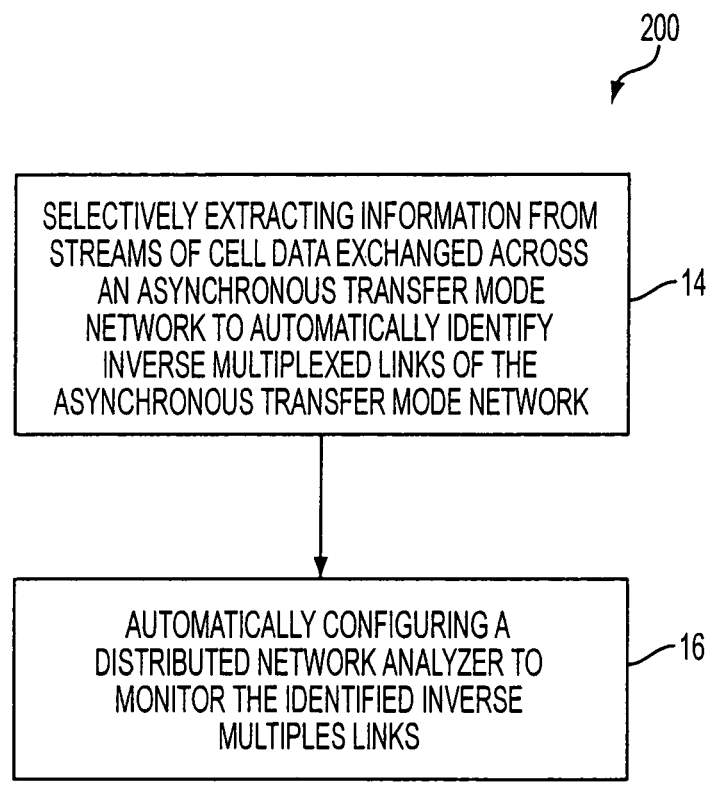
FIG. 2 is a diagram illustrating a method of selectively extracting information from streams of cell data to automatically identify IMA links of an asynchronous transfer mode network and to configure a distributed network analyzer to monitor the identified IMA links, according to an embodiment of the present invention.

FIG. 2 is a diagram illustrating a process 200 for selectively extracting information from streams of cell data to automatically identify IMA links of an asynchronous transfer mode network and to configure a distributed network analyzer to monitor the identified IMA links, according to an embodiment of the present invention. Referring to FIG. 2, in operation 14, information is selectively extracted from streams of cell data exchanged across an IMA network. According to an aspect of the present invention, information of an IMA network is extracted to automatically identify each IMA link of the IMA network. For example, the IMA links are identified using IMA Control Protocol (ICP) spacing where it is determined whether ICP cells have arrived at predetermined intervals. While identification of the IMA links is described using ICP spacing, the present invention is not limited to any particular method of identifying IMA links.

From operation 14, the process 200 moves to operation 16, where a distributed network analyzer is automatically configured to monitor the identified IMA links. Here, for example, the identified IMA links are transmitted to the distributed network analyzer to configure the distributed network analyzer to monitor the identified IMA links. For example, the identified IMA links are transmitted to the distributed network analyzer to configure the distributed network analyzer to determine status information of the IMA links including data indicative of at least one of loss of signal, loss of frame and header error control of each of the IMA links. However, the present invention is not limited to determining any particular status information of IMA links.

Figure 3:
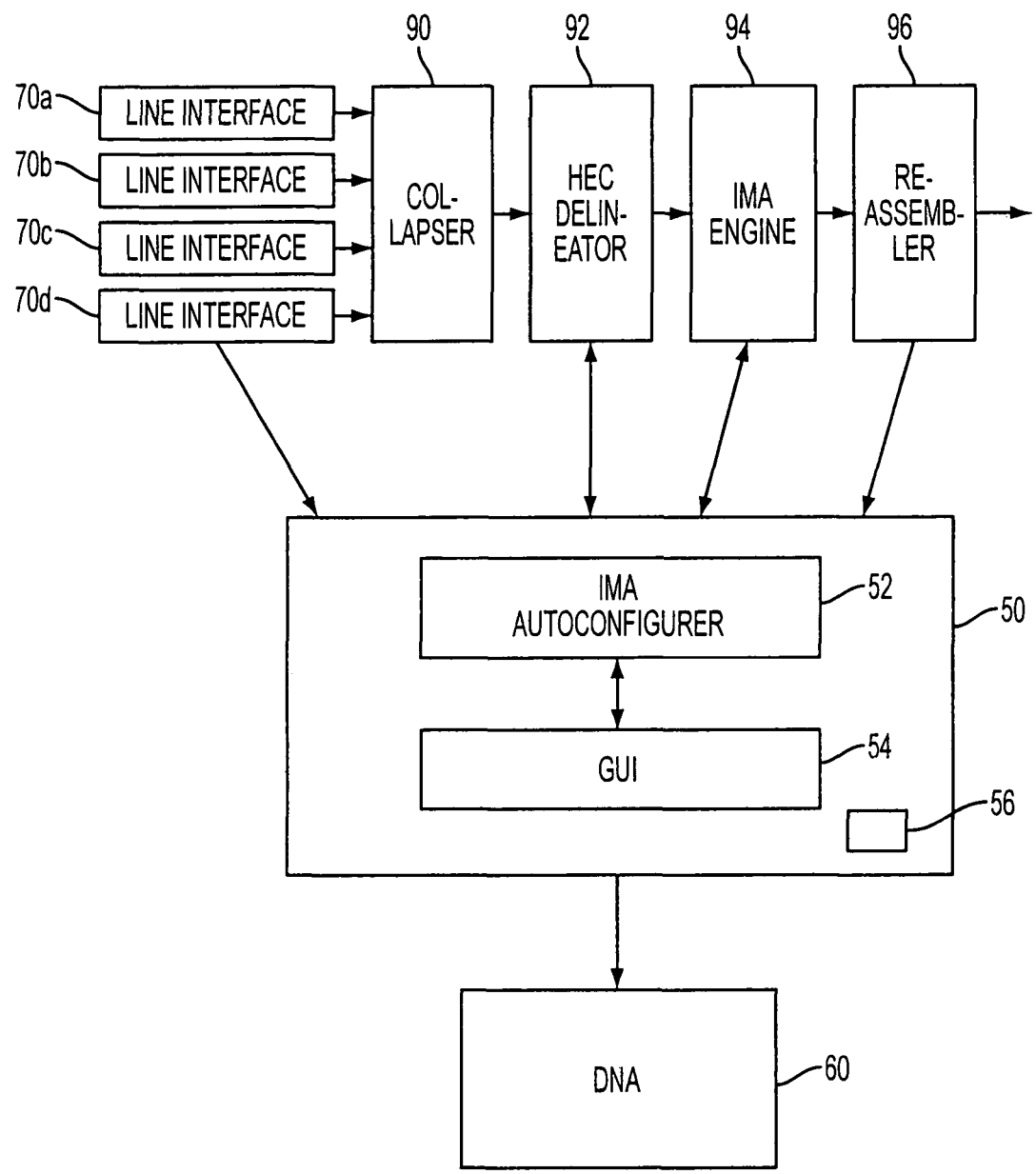
FIG. 3 is a diagram illustrating a configuration of an apparatus to automatically identifying IMA links of an asynchronous transfer mode network and automatically configuring a distributed network analyzer to monitor the identified IMA links, according to an embodiment of the present invention.

FIG. 3 is a diagram illustrating a configuration of an apparatus 50 to automatically identify IMA links of an asynchronous transfer mode network and automatically configure a distributed network analyzer to monitor the identified IMA links, according to an embodiment of the present invention. As shown in FIG. 3, line interfaces 70a, 70b, 70c and 70d are connected with a collapser 90 that combines all IMA links that are detected into one stream by adding IMA link identifiers to each IMA link to allow only one instance of downstream blocks for processing. For example, the line interfaces 70a, 70b, 70c and 70d may be multiple T1/E1 ports or multiple higher rate ports that can be demultiplexed to T1/E1s. While the line interfaces 70a, 70b, 70c and 70d are described in terms of T1 or E1 ports, the present invention is not limited to T1 or E1 ports. For example, the ATM data may be transmitted via high-speed connections, such as OC-3, DS3/E3, etc.

Referring to FIG. 3, the line interfaces 70a, 70b, 70c and 70d are also connected with an apparatus 50 having an autoconfigurer 52, a graphical user interface (GUI) 54 and an autoconfigure button 56. For example, the line interfaces 70a, 70b, 70c and 70d provide ATM data related to loss of signal and loss of frame, etc. in accordance with detected IMA links. While the line interfaces 70a, 70b, 70c and 70d are described in relation to providing loss of signal and loss of frame information, the line interfaces 70a, 70b, 70c and 70d are not limited to any particular function.

The collapser 90 is connected with a header error control (HEC) delineator 92 to enable detection of ATM cells, for example, by checking a value of a header error control byte and other header bytes. The HEC delineator 92 detects whether single or multi HEC errors have occurred in accordance with the detection of ATM cells, according to an aspect of the present invention. Further, as shown in FIG. 3, the HEC delineator 92 is connected to the apparatus 50 to exchange IMA data. For example, the HEC delineator 92 transmits IMA data such as loss of delineation errored seconds, single and multi-bit errored seconds, etc., to the apparatus 50. However, the HEC delineator 92 is not limited to providing any particular IMA data.

As shown in FIG. 3, the HEC delineator 92 is connected with an IMA engine 94. The IMA engine 94 performs various functions, for example, the IMA engine 94 executes an IMA function where multiple streams of ATM cells are interleaved to form a higher rate cell stream, detects IMA control protocol (ICP) cells, extracts the ICP cell spacing (M value), checks the spacing of the cells based on that M value and checks a cyclic redundancy check (CRC) value, etc. The IMA engine 94 is connected to the apparatus 50 to transmit information of each IMA link including IMA group numbers, an M value, a link number, an indication of presence of ICP cells, ICP cell CRC errored seconds, ICP cell spacing errored seconds, etc. While the IMA engine 94 is described in relation to certain information of IMA links, the IMA engine 94 is not limited to any particular IMA function.

Referring to FIG. 3, the IMA engine 94 is also connected with a reassembler 96 that performs, for example, ATM adaptation layer (AAL) 5 and AAL2 reassembly, checks for CRC-32 errors on AAL5 streams and for mini-cell HEC errors on AAL2 streams, etc. The reassembler 96 is also connected with the apparatus 50 to provide information such as ML5 CRC-32 errored seconds, AAL2 mini-cell HEC errored seconds, etc. However, while reassembler 96 is described in relation to performing certain functions, the reassembler 96 is not limited to any particular function. Line interfaces 70a, 70b, 70c and 70d, collapser 90, HEC delineator 92, IMA engine 94 and reassembler 96 are known devices.

The apparatus 50 of FIG. 3 automatically identifies IMA links of an asynchronous transfer mode network based on information received from the line interfaces 70a, 70b, 70c and 70d, HEC delineator 92, IMA engine 94 and reassembler 96. Further, the GUI 54 of the apparatus 50, for example, displays a list of IMA groups, IMA links, status information of the IMA groups and links, link source identifiers, port and tributary numbers, etc., upon, for example, a single command from an end user.

As also shown in FIG. 3, a distributed network analyzer 60 is connected with the apparatus 50 to enable the distributed network analyzer 60 to be automatically configured to monitor the identified IMA links. The apparatus 50 executes automated identification of IMA links to automatically configure the distributed network analyzer 60 to monitor the identified IMA links. For example, the IMA autoconfigurer 52 of the apparatus 50 may be a software that performs identification of all IMA links based on determination of whether a detected number of IMA links matches a predetermined number of IMA links to automatically configure the distributed network analyzer 60 to monitor the identified IMA links.

Referring to FIG. 3, the autoconfigure button 56 of the apparatus 50 triggers automated identification of IMA links of an asynchronous transfer mode network and automated configuration of the distributed network analyzer 60 to monitor the identified IMA links. However, the apparatus 50 is not limited to any particular configuration, or to including the autoconfigure button 56. For example, an operation of the autoconfigure button 56 may be implemented using any instruction directing the apparatus 50 to perform automated identification of the IMA links and automated configuration of the distributed network analyzer 60, such as graphical objects of the GUI 54, function keys, choices in a menu, etc.

Figure 4:
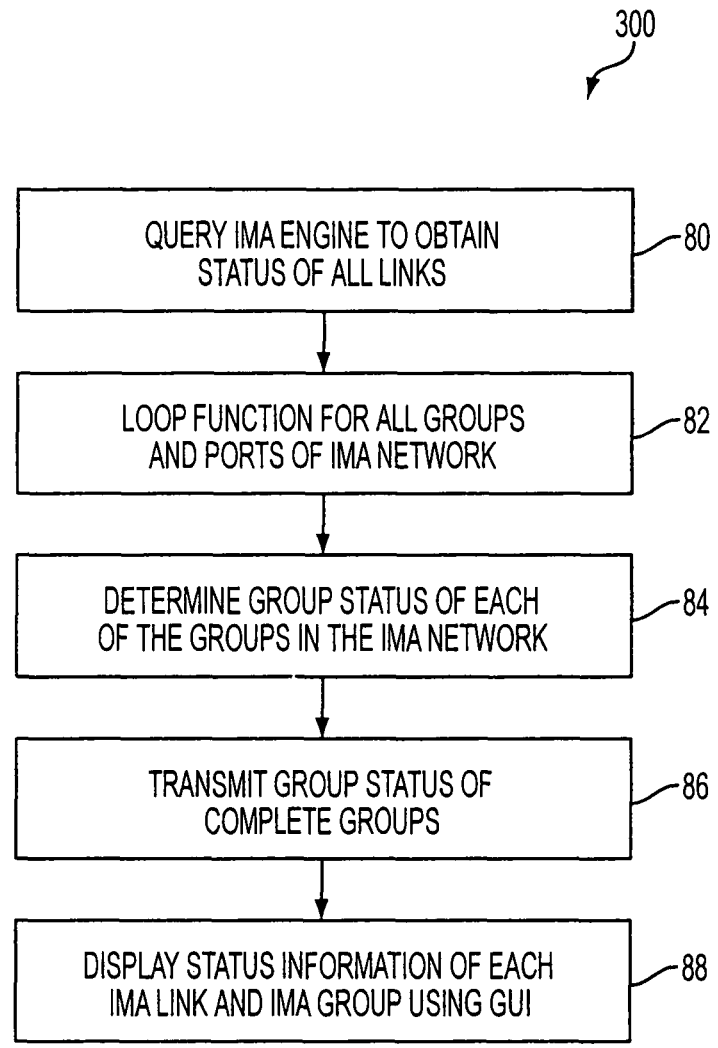
FIG. 4 is a diagram illustrating a method of automatically identifying IMA links of an asynchronous transfer mode network and automatically configuring a distributed network analyzer to monitor the identified IMA links, according to an embodiment of the present invention.

FIG. 4 is a diagram illustrating a method 300 of automatically identifying IMA links of an asynchronous transfer mode network and automatically configuring a distributed network analyzer to monitor the identified IMA links, according to an embodiment of the present invention. As shown in FIG. 4, at operation 80, an IMA engine 94 of FIG. 3 is queried to obtain status of all links. For example, status of all links includes, for example, data such as loss of signal, loss of frame, HEC errors, HEC delineation status, ICP spacing (M value), CRC on ICP cells, link number or linkid, and group number, etc. However, the status of all links is not limited to any particular information of the links in an IMA network.

From operation 80, the process 300 moves to operation 82, where the present invention executes a loop function for all groups and ports of the IMA network. For example, a loop function is executed though each group, for example, from 0 to 255. While the loop function is described using group numbers 0 to 255, the present invention is not limited to executing a loop for any particular number of groups in an IMA network.

From operation 82, the process 300 moves to operation 84, where the present invention determines group status of each of the groups in the IMA network. For example, group status indicates that the groups are complete with no errors, the groups are complete with errors, or the groups are incomplete. However, the present invention is not limited to any particular information that indicates status of groups in an IMA network.

From operation 84, the process 300 moves to operation 86, where the present invention transmits group status of complete groups to the apparatus 50 shown in FIG. 3 in accordance with determination performed at operation 84. For example, the group status may include IMA link and port number, etc. However, operation 86 is not limited to transmitting any particular type of group status information.

From operation 86, the process 300 moves to operation 88, where the present invention displays status information of each IMA link and IMA group using the GUI 54 shown in FIG. 3. For example, CRC-32 error rates of any AAL-5 reassembled data and any AAL2 minicell HEC error rates for each IMA group. While certain status information of the IMA links is discussed, the present invention is not limited to any particular status information of IMA links.

Figure 5:
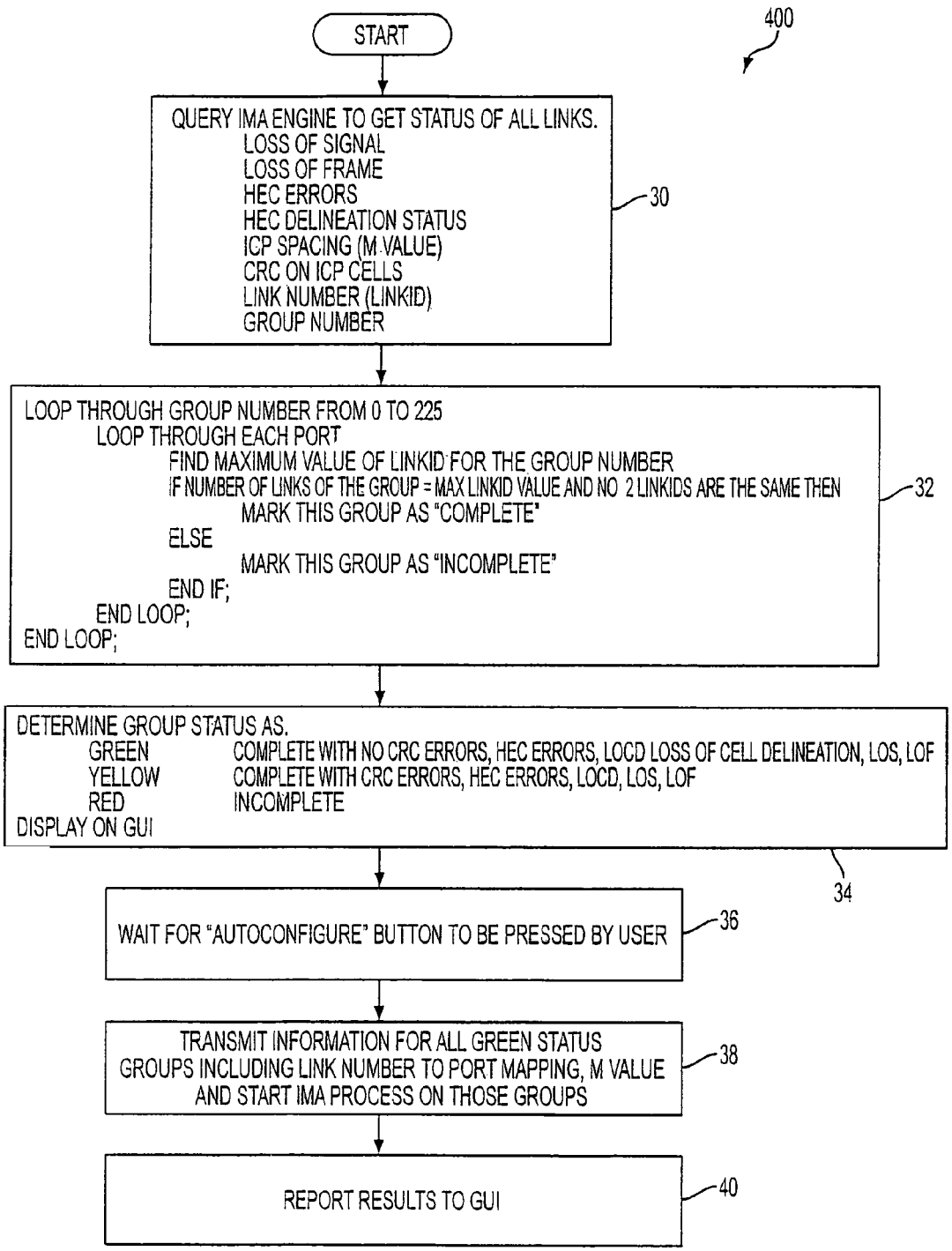
FIG. 5 is a diagram illustrating a more detailed method of automatically identifying IMA links of an asynchronous transfer mode network and automatically configuring a distributed network analyzer to monitor the identified IMA links, according to an embodiment of the present invention.

FIG. 5 is a diagram illustrating a more detailed method 400 of automatically identifying IMA links of an asynchronous transfer mode network and automatically configuring a distributed network analyzer to monitor the identified IMA links, according to an embodiment of the present invention. As shown in FIG. 5, at operation 30, an IMA engine queries to obtain status of all IMA links in an IMA network. For example, status information of the IMA links includes, for example, data related to loss of signal, loss of frame, HEC errors, HEC delineation status, ICP spacing (M value), CRC on ICP cells, link number or linkid, and group number, etc. However, the status information is not limited to any particular status information of IMA links in an IMA network.

From operation 30, the process 400 moves to operation 32, where the present invention determines whether the IMA links queried by the IMA engine in operation 30 is a complete list. For example, as shown in FIG. 5, the present invention executes a loop through IMA group number 0 to 255 and loops through each port of an IMA network to find a maximum value of a link identification (or linkid) for the group number. Then, if the number of links of the group equals the maximum linkid value and no two linkids are alike, operation 32 determines that indicates that the IMA links are complete.

From operation 32, the process 400 moves to operation 34 where the present invention determines group status of the IMA links. For example, at operation 34, the present invention indicates whether a group listing is complete with, for example, no CRC errors, HEC errors, loss of cell delineation (LOCD), loss of signal, loss of frame, whether the group listing is compete but there are CRC errors, HEC errors, loss of cell delineation (LOCD), loss of signal, loss of frame and whether the group listing is incomplete. The information indicative of whether the group listing is complete but contains errors, complete without errors and incomplete is displayed using the GUI 54 shown in FIG. 3. According to an aspect of the present invention, the group status is provided using a color-coded GUI. For example, the color green may be used to indicate that the group status is complete and without an error, the color yellow may be used to indicate that the group status is complete but has errors, and the color red may be used to indicate that the group status is incomplete.

However, the present invention is not limited to any particular GUI to display status information of the IMA links.

From operation 34, the process 400 moves to operation 36 where the present invention waits for the autoconfigure button 56 shown in FIG. 32 to be pressed by a user. The present invention maintains information in relation to the IMA network and provides the determined information upon an autoconfigure command from the user.

From operation 36, the process 400 moves to operation 38 where information for all green status groups including link number to port mapping, M value is transmitted, and IMA process is started on the groups. While operations 36 and 38 are described using the color green to refer to complete group status, the present invention is not limited to any particular way of indicating any group status.

From operation 38, the process 400 moves to operation 40 where results of operation 38 are reported to the GUI 54 shown in FIG. 3. For example, the results of operation 38 includes, data indicating CRC-32 error rates of any AAL-5 reassembled data, any AAL2 minicell HEC error rates for each group, etc. While certain status information of the IMA links is discussed, the present invention is not limited to any particular status information of IMA links.

According to an aspect of the present invention, processes 300 and 400 shown in FIGS. 4 and 5, respectively, are performed using the apparatus 50 shown in FIG. 3. However, the present invention is not limited to any particular configuration of the apparatus 50 shown in FIG. 3.

Accordingly, an automated operation to automatically identifying IMA links of an asynchronous transfer mode network and automatically configuring a distributed network analyzer to monitor the identified IMA links is provided. This enables IMA users to conveniently and readily determine respective IMA information. Further, the automated identification of the IMA links includes indicating corresponding IMA groups of each of the IMA links.

The present invention also provides IMA users with a graphical user interface displaying status information of automatically identified IMA links of an asynchronous transfer mode network, where the status information is provided based on monitoring of the identified IMA links using a distributed network analyzer automatically configured to monitor the identified IMA links. For example, the IMA links of an IMA network are automatically identified based on query of data obtained, such as IMA control protocol cell (ICP) spacing, in relation to the IMA links. This eliminates the need for IMA users to manually setup or configure monitoring of IMA links. While identification of the IMA links is described by implementing a query obtaining ICP spacing information, the present invention is not limited to any particular number of queries. For example, the present information displays status information indicative of when a number of the identified IMA links does not match a predetermined number of IMA links.

The present invention also provides a method for selectively extracting information from streams of cell data exchanged across an asynchronous transfer mode network to automatically identify IMA links of the asynchronous transfer mode network, and automatically configuring a distributed network analyzer to monitor the identified IMA links. Moreover, the automated identification of the IMA links includes indicating corresponding IMA groups of each of the identified IMA links, and enables selective configuration of the distributed network analyzer to monitor a selected portion of the indicated IMA groups.

Although a few embodiments of the present invention have been shown and described, it will be appreciated by those skilled in the art that changes may be made in these embodiments without departing from the principles and spirit of the invention, the scope of which is defined in the appended claims and their equivalents.

What is claimed is:

1. A method, comprising:
   automatically differentiating IMA (inverse multiplexing over asynchronous transfer mode) data from other ATM data transmitted on a plurality of links in an asynchronous transfer mode network for identifying IMA links of the asynchronous transfer mode network; and
   automatically configuring a distributed network analyzer to monitor only the identified IMA links;
   wherein the automated identification of the IMA links includes indicating corresponding IMA groups of each of the IMA links;
   displaying status information of the monitored IMA links;
   wherein the status information includes data indicative of loss of signal, loss of frame and header control error of each of the IMA links.

2. The method according to claim 1, wherein the automated identification of the IMA links is initiated in response to a single command by an end user.

3. The method according to claim 1, wherein the status information indicates when a number of the identified IMA links does not match a predetermined number of IMA links.

4. The method according to claim 1, wherein the status information indicates an error rate for each of the indicated IMA groups.

5. The method according to claim 1, wherein the automatically configuring the distributed network analyzer further comprises determining status information of the IMA links.

6. The method according to claim 1, wherein the step of automatically differentiating IMA data from other ATM data includes determining whether IMA control protocol cells (ICP) have arrived at predetermined intervals.

7. A method, comprising: selectively extracting information from streams of cell data exchanged across an asynchronous transfer mode network to differentiate IMA (inverse multiplexing over asynchronous transfer mode) data from other ATM data transmitted on a plurality of links in an asynchronous transfer mode network for identifying IMA links of the asynchronous transfer mode network; and
   automatically configuring a distributed network analyzer to monitor only the identified IMA links;
   wherein the automated identification of the IMA links includes indicating corresponding IMA groups of each of the identified IMA links;
   displaying status information of the IMA groups monitored by the distributed network analyzer;
   wherein the status information includes data indicative of loss of signal, loss of frame and header control error of each of the IMA links.

8. The method according to claim 7, wherein said automatically configuring comprises: selectively configuring the distributed network analyzer to monitor a selected portion of the indicated IMA groups.

9. The method according to claim 7, wherein the status information indicates when a number of the identified IMA links does not match a predetermined number of IMA links.

10. The method according to claim 7, wherein the automated identification of the IMA links is initiated in response to a single command by an end user.

11. The method according to claim 7, wherein the status information indicates link identification data of the IMA links and group identification data of the corresponding IMA groups.

12. The method according to claim 7, wherein the automatically configuring the distributed network analyzer further comprises determining status information of the IMA links.

13. The method according to claim 7, wherein the step of automatically differentiating IMA data from other ATM data includes determining whether IMA control protocol cells (ICP) have arrived at predetermined intervals.

* * * * *